June 22, 1965 — R. J. HOLTON — 3,190,167
ROTARY SHEET METAL FASTENER
Filed June 13, 1961
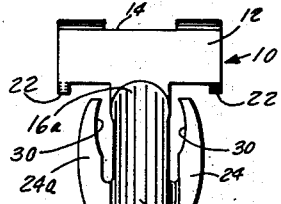
Fig. 1
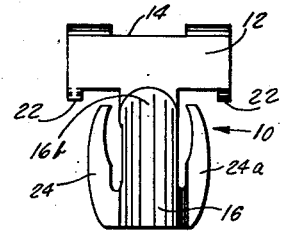
Fig. 2
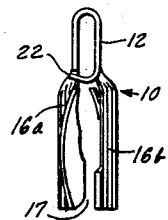
Fig. 3
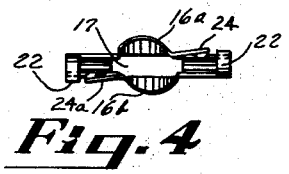
Fig. 4
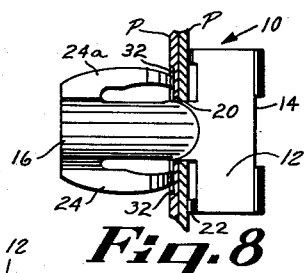
Fig. 5
Fig. 8
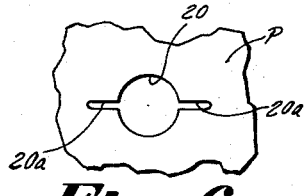
Fig. 6
Fig. 7
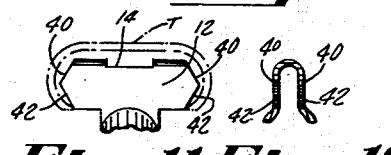
Fig. 11   Fig. 12
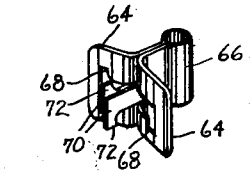
Fig. 19
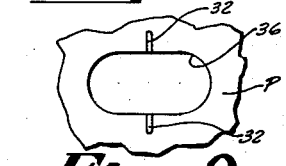
Fig. 9
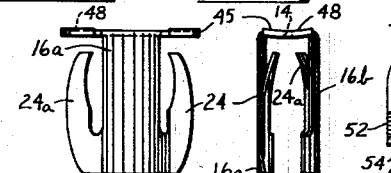
Fig. 13   Fig. 14
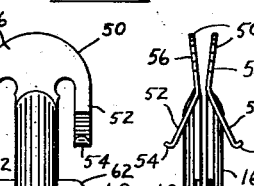
Fig. 16   Fig. 17
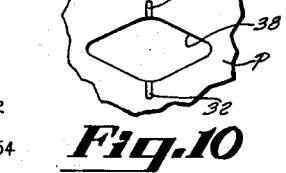
Fig. 10
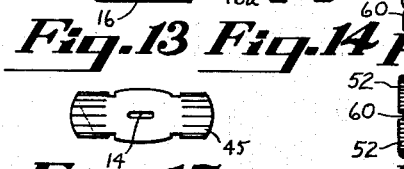
Fig. 15
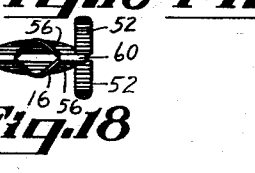
Fig. 18
INVENTOR.
BY ROBERT J. HOLTON
Teare, Fetzer & Teare
ATTORNEYS

United States Patent Office 3,190,167
Patented June 22, 1965

---

3,190,167
ROTARY SHEET METAL FASTENER
Robert J. Holton, Cleveland, Ohio, assignor to Tinnerman Products, Inc., Cleveland, Ohio, a corporation of Ohio
Filed June 13, 1961, Ser. No. 116,786
5 Claims. (Cl. 85—5)

This invention relates in general to fastener means, and more particularly to rotary fasteners, adapted to be made from a single piece of metal stock or the like, and operative to be quickly attached to and detached from an apertured supporting panel or part, in response to partial rotation of the fastener.

Rotary type fasteners are known in the fastener art, but generally these fasteners are unduly expensive and/or are somewhat difficult to attach in operative position in the receiving aperture of the supporting panel, especially if such apertures are not produced to exact tolerances, and vary somewhat in size.

Accordingly, an object of the present invention is to provide a quickly operable rotary type fastener which may be conveniently and readily actuated into holding position on an apertured supporting panel or part.

Another object of the invention is to provide a fastener of the above type which includes a shank portion adapted for passage into a receiving aperture in a supporting part or panel, and wherein the shank includes means thereon for facilitating the shank's movement into the aperture irrespective of tolerance variations in the aperture size.

Another object of the invention is to provide a fastener of the above type which may be inexpensively produced from flat metal stock, such as sheet metal, to provide an economically desirable arrangement.

A further object of the invention is to provide a fastener of the above type, wherein the head of the fastener embodies means thereon for holding in mounting relation on the support panel or part, another object, such as for instance, trim strip or the like.

A more specific object of the invention is to provide a rotary type fastener produced from flat sheet metal stock and formed into a head portion and a depending split shank portion, with the shank portion having upwardly extending flexible wing portions thereon, for rotative engagement with the underside of an apertured support panel, and wherein the splitshank provides lateral resiliency to the shank, for ready insertion into an undersized receiving aperture in the supporting panel.

Other objects and advantages of the invention will be apparent from the following description taken in conjunction with the accompanying drawings wherein:

FIG. 1 is an elevational view taken from one side of a rotary fastener constructed in accordance with the instant invention;

FIG. 2 is an elevational view taken from the other side of FIG. 1;

FIG. 3 is an end elevational view taken generally from the right hand end of FIG. 1;

FIG. 4 is a bottom plan view of the fastener of FIGS. 1 to 3;

FIG. 5 is a plan view of a blank from which the fasteners shown in FIGS. 1 to 4 may be produced;

FIG. 6 is a plan view of a work panel or part provided with an aperture adapted to accommodate the fasteners of the present invention;

FIG. 7 is a plan view taken from the other side of the work panel of FIG. 6, and illustrating in particular indentations formed in the work panel for receiving therein the ends of the resilient wings of the rotary fastener, to aid in retaining the same in mounted position on the supporting panel;

FIG. 8 is a sectional view showing a fastener of the FIGS. 1 to 4 type, mounted on a pair of juxtaposed apertured panels, and holding the latter together;

FIG. 9 is a plan view of a modified form of aperture in a supporting panel;

FIG. 10 is a plan view of a further modified form of aperture in a supporting panel;

FIG. 11 is a fragmentary side elevational view of a modified form of the head of the fastener of the invention, and particularly a fastener which is adapted for holding in mounting relation on the supporting panel another object, such as trim strip or the like;

FIG. 12 is a fragmentary end elevational view taken generally from the right hand end of FIG. 11;

FIG. 13 is a side elevational view of a further modified form of fastener of the invention;

FIG. 14 is an end elevational view taken generally from the right hand end of FIG. 13;

FIG. 15 is a top plan view of the fastener of FIGS. 13 and 14;

FIG. 16 is a side elevational view of a further embodiment of the fastener of the invention;

FIG. 17 is an end elevational view of the FIG. 16 fastener;

FIG. 18 is a bottom plan view of the FIG. 16 fastener;

FIG. 19 is a bottom perspective view of a further embodiment of the fastener.

Referring now again to the drawings, and in particular to FIGS 1 to 8 inclusive, number 10 designates a fastener produced in accordance with the instant invention. The fastener may be formed from a single piece or blank of sheet metal stock, as illustrated for instance in FIG. 5, with such blank being subsequently bent into the fastener configuration illustrated in FIGS. 1 to 4 inclusive. Fastener 10 comprises a generally inverted U-shaped (in end elevation) head portion 12, having a top recess or slot 14 formed therein, which recess not only facilitates bending of the fastener into finalized form, but also provides an aperture which may receive therein a pointed instrument or work tool, such as a screwdriver, for turning the fastener into its holding position on the supporting panel or panels P.

Depending from head 12 is a split shank portion 16 defining leg portions 16a and 16b. Leg portions 16a and 16b are convexly curved on their exterior surfaces, and are disposed in spaced relation as at 17 with respect to one another, to give a considerable degree of lateral or transverse resiliency to the shank of the fastener, thereby facilitating its insertion into a poor tolerance or tight fitting aperture 20 in the supporting panel. The underside of the head portion 12 is also preferably provided with curved cam or slide elements 22, which facilitate rotary movement of the fastener into its holding or mounting position on the supporting panel. Such elements 22 also give a somewhat added axial resilience to the fastener, thereby providing for its use with greater panel thickness variations.

Each of the leg portions 16a, 16b is provided with an upwardly projecting generally flexible or resilient wing 24, 24a, which wing is preferably curved somewhat inwardly, to terminate beneath the head of the fastener. It will be noted that wing 24 is inwardly curved in one direction, while wing 24a is inwardly curved in the opposite direction, whereby the fastener is adapted to rotate in a direction opposite to the inward curvature of the wings. Wings 24, 24a are cut away as at 30, to increase the flexibility of such wing portions, and thereby facilitate the mounting or twisting of the fastener in the work receiving aperture in the supporting panel.

The fastener is inserted in the aperture 20 in the work panel with the split shank providing for ready insertion into an undersized aperture, and then the fastener is rotated preferably in a direction opposite to the direction of inward curvature of the wing portions, until the free ends of the wing portions move into the indentations 32 adjacent the periphery of the aperture, with such coaction between the indentation 32 and the free ends of the resilient wing portions aiding in retaining the fastener in attached condition on the supporting panel. The distance between the free ends of the wing portions 24, 24a and the underside of slide portions 22 is so chosen that the wings and the slide portions 22 will flex or bend somewhat during twisting of the fastener, and with the free ends of the resilient wings being urged into biting relation with the confronting side of the panel, to increase the vibration resistance of the fastener. The fastener may be rotated into holding position either by the use of the aforementioned screwdriver, or by the use of a pair of pliers engaging the head 12, or even by the use of a workman's fingers, depending upon the size and resilience of the fastener. As is illustrated in FIG. 3, the fastener can be utilized to hold together two or more panels of predetermined thickness. In order to disassemble the fastener from the work panels, rotation of the fastener is effected until the free ends of the wing portions move into the elongated slotted portions 20a of the aperture, whereupon the fastener can be withdrawn from the supporting panel.

FIGS. 9 and 10 illustrate possible modifications of the aperture in the panel, with FIG. 9 illustrating an elongated oval-shaped aperture 36, and FIG. 10 illustrating a more or less diamond-shaped aperture 38.

Referring now to FIGS. 11 and 12, there is shown a modified form of a head portion for the fastener of the invention, and wherein such head comprises generally V-shaped, in side elevation, end surfaces 40, 42, whereupon the head of the fastener may be utilized to hold or mount an article, such as a trim strip T or the like, on the supporting part, such trim strip being of the well known resilient type, for snap fastening coaction with the outwardly convergent cam surfaces 40, 42 of the head.

FIGS. 13 to 15 illustrate a further embodiment of the fastener. Such modified fastener is generally similar to the aforedescribed construction except that its head 45 is of generally flat configuration with a slight concave or outwardly bowed configuration as at 48, to increase the rotative ability of the fastener with respect to the supporting panel, and aid in preventing "galling" of the panel as the fastener is turned into locking position.

Referring now to FIGS. 16 to 18, there is shown a further embodiment of the rotary type fastener of the invention. In this embodiment, the head portion 50 of the fastener includes opposed, diagonally downwardly extending fingers 52, which are adapted to resiliently or flexibly engage the confronting side of the supporting panel to exert an axial tension on the fastener. It will be noted that the free ends of the fingers 52 are preferably bent outwardly as at 54, to increase the rotative ability of the fastener. The tab portions 56 which form the head 50 of the fastener are preferably spaced from one another to give a certain degree of lateral resiliency to the split shank portion 16. Laterally projecting lugs or wings 60 are provided on the shank for movement through the receiving aperture in the panel and into locking coaction with the confronting side of the panel upon turning or twisting of the fastener. The outer corners 62 of wings 60 are preferably rounded, as illustrated, to decrease the resistance to rotation of the fastener.

FIG. 19 illustrates a further embodiment of a fastener wherein the latter may be formed of a strip or blank bent upon itself, with the ends of the blank spread outwardly with respect to one another, as shown, to form resilient finger portions 64. The bend in the blank may be deformed cylindrically-like as at 66, to form a head for the fastener. The finger portions 64 may be partially severed, as at 68, to form shank portions 70 which are pressed together to form the shank of the fastener. Each of the shank portions adjacent its free end has a lug or wing portion 72 which is adapted for holding coaction with the confronting side of the apertured supporting panel, against the axial tension applied by the resilient fingers 64, when the fastener has been turned or rotated into locking position.

From the foregoing discussion and accompanying drawings it will be seen that the invention provides a quickly operable, rotary-type fastener, which may be inexpensively produced from flat stock, such as sheet metal, and which may comprise a resilient shank portion for facilitating the insertion of the fastener into an aperture in a supporting part or panel, and wherein the fastener is readily attached to and detached from the supporting panel or part.

The terms and expressions which have been used are used as terms of description and not of limitation, and there is no intention in the use of such terms and expressions of excluding any equivalents of any of the features shown, or described, or portions thereof, but it is recognized that various modifications are possible within the scope of the invention claimed.

I claim:

1. A rotary fastener formed of sheet metal and adapted for assembly with an apertured support panel comprising, an elongated head of inverted U-shaped configuration in end elevation, with the open end of the U adapted to face the support panel, a resilient cam-like element bent inwardly on the underside and extending from each end surface of the inverted U-shaped head transversely across the open end thereof, said elements being situated on said head adjacent each of its opposed ends and being adapted for coacting engagement with the confronting surface of said support panel, a split shank depending downwardly from said head defining a pair of oppositely disposed leg portions, each of said leg portions being integral with and extending one from each of the sides of the open end of said U-shaped head, said leg portions being spaced laterally from one another throughout their lengths to provide transverse resiliency in said shank, said leg portions having convex exterior surfaces in a generally transverse direction, the transverse dimension of said shank being at least as great as the transverse dimension of said head as measured in the same plane, each of said leg portions including a single outwardly extending resilient wing on one side thereof commencing adjacent the lower extremity of the respective leg portion and projecting upwardly toward said head, each of said wings being cut away toward its upper end so as to be substantially laterally spaced from its respective leg portion, and the terminal end of each of said wings being disposed in predetermined spaced relation with respect to said head, both of said wings being inwardly curved in the opposite direction relative to a vertical plane passing through said shank, to facilitate rotary movement of said fastener in the opposite direction relative to said curvature upon assembly with said support panel.

2. A rotary fastener in accordance with claim 1, wherein each of said resilient cam-like elements extends beyond the surface opposite to which the respective element is attached.

3. A rotary fastener in accordance with claim 1, wherein said head has angularly extending end portions for mounting an associated object on the support panel.

4. A rotary fastener in accordance with claim 1, wherein the lateral outermost extremity of each of said wings is spaced laterally inwardly from the respective one of said cam-like elements on said head.

5. A rotary fastener in accordance with claim 1, wherein said head includes an elongated slot therein adapted to receive a tool for turning the fastener.

References Cited by the Examiner
UNITED STATES PATENTS

| | | | |
|---|---|---|---|
| 2,143,603 | 1/39 | Lombard | 85—5 |
| 2,238,854 | 4/41 | Wagstaff | 85—5 |
| 2,318,840 | 5/43 | Del Camp | 85—5 |
| 2,580,319 | 12/51 | Poupitch | 85—5 |
| 2,629,913 | 3/53 | Schlueter | 85—5 |

EDWARD C. ALLEN, *Primary Examiner.*
CARL W. TOMLIN, M. HENSON WOOD, Jr.,
*Examiners.*